United States Patent
Ganapathy et al.

(10) Patent No.: US 9,479,975 B2
(45) Date of Patent: Oct. 25, 2016

(54) COMMUNICATION SYSTEM

(71) Applicant: NEC CORPORATION, Minato-ku, Tokyo (JP)

(72) Inventors: Suresh Ganapathy, Tokyo (JP); Jagdeep Singh Ahluwalia, Tokyo (JP); Neeraj Gupta, Tokyo (JP); Kenji Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 210 days.

(21) Appl. No.: 14/361,681

(22) PCT Filed: Nov. 15, 2012

(86) PCT No.: PCT/JP2012/080249
§ 371 (c)(1),
(2) Date: May 29, 2014

(87) PCT Pub. No.: WO2013/084720
PCT Pub. Date: Jun. 13, 2013

(65) Prior Publication Data
US 2014/0315557 A1 Oct. 23, 2014

(30) Foreign Application Priority Data

Dec. 6, 2011 (GB) .................................... 1120956.6

(51) Int. Cl.
*H04W 36/00* (2009.01)
*H04W 48/04* (2009.01)
*H04W 48/06* (2009.01)
(Continued)

(52) U.S. Cl.
CPC ..... *H04W 36/0072* (2013.01); *H04W 36/0022* (2013.01); *H04W 36/0055* (2013.01); *H04W 48/04* (2013.01); *H04W 48/06* (2013.01); *H04W 88/08* (2013.01); *H04W 84/045* (2013.01)

(58) Field of Classification Search
CPC .................................................. H04W 36/0072
See application file for complete search history.

(56) References Cited

U.S. PATENT DOCUMENTS

| 7,773,578 | B2 | 8/2010 | Liu |
| 8,170,548 | B2 | 5/2012 | Iwamura et al. |
| 8,787,911 | B2 | 7/2014 | Johnstone et al. |

(Continued)

FOREIGN PATENT DOCUMENTS

| EP | 2083587 A1 | 7/2009 |
| EP | 2209340 A1 | 7/2010 |

(Continued)

OTHER PUBLICATIONS

Japanese Office Action dated Jun. 3, 2015 with a partial English translation.

(Continued)

*Primary Examiner* — Justin Lee
(74) *Attorney, Agent, or Firm* — McGinn IP Law Group, PLLC

(57) ABSTRACT

A communication system includes a communication network including a plurality of communication cells, a plurality of mobile communication devices each operable to connect into the communication network via at least one of the communication cells, and a communication apparatus for providing at least one of the communication cells. The communication apparatus includes first and second base station functions each operable to acquire a congestion status and access control information for the other base station.

36 Claims, 5 Drawing Sheets

(51) Int. Cl.
*H04W 88/08* (2009.01)
*H04W 84/04* (2009.01)

(56) References Cited

U.S. PATENT DOCUMENTS

| | | | |
|---|---|---|---|
| 8,892,089 | B2 | 11/2014 | Nitta et al. |
| 8,903,402 | B2 | 12/2014 | Guo et al. |
| 2006/0276190 | A1 | 12/2006 | Shaheen |
| 2007/0232311 | A1* | 10/2007 | Kuhn .................. H04W 36/22 455/436 |
| 2008/0069032 | A1 | 3/2008 | Liu |
| 2010/0075675 | A1 | 3/2010 | Yang et al. |
| 2010/0150102 | A1* | 6/2010 | Li ........................ H04W 36/24 370/331 |
| 2010/0184439 | A1 | 7/2010 | Chen et al. |
| 2010/0279689 | A1 | 11/2010 | Tinnakornsrisuphap et al. |
| 2011/0019639 | A1 | 1/2011 | Karaoguz et al. |
| 2011/0039564 | A1 | 2/2011 | Johnstone et al. |
| 2011/0070888 | A1 | 3/2011 | Iwamura et al. |
| 2011/0182271 | A1* | 7/2011 | Pica .................. H04W 36/0083 370/332 |
| 2011/0274038 | A1* | 11/2011 | Zhu .................. H04W 36/0022 370/328 |
| 2011/0275362 | A1 | 11/2011 | Nitta et al. |
| 2011/0305184 | A1* | 12/2011 | Hsu .................... H04L 65/4076 370/312 |
| 2012/0002637 | A1 | 1/2012 | Adjakple et al. |
| 2012/0282931 | A1 | 11/2012 | Giustina et al. |
| 2013/0028187 | A1 | 1/2013 | Aoyagi et al. |
| 2013/0260768 | A1 | 10/2013 | Guo et al. |
| 2015/0024755 | A1 | 1/2015 | Shaheen |
| 2015/0133124 | A1* | 5/2015 | Lim ...................... H04W 36/04 455/436 |

FOREIGN PATENT DOCUMENTS

| | | |
|---|---|---|
| EP | 2282578 A1 | 2/2011 |
| GB | 2474503 A | 4/2011 |
| JP | 2008-506322 A | 2/2008 |
| JP | 2010-268512 A | 11/2010 |
| JP | 2011-239010 A | 11/2011 |
| WO | WO 2006/124950 A2 | 11/2006 |
| WO | WO 2011/018639 A1 | 2/2011 |
| WO | WO 2011/048410 A1 | 4/2011 |
| WO | WO 2011/099178 A1 | 8/2011 |
| WO | WO 2011/116694 A1 | 9/2011 |
| WO | WO 2011/160120 A1 | 12/2011 |

OTHER PUBLICATIONS

International Search Report in PCT/JP2012/080249 dated Jul. 3, 2013 (English Translation Thereof).
3GPP TS 25.331 v10.5.0 (Sep. 2011) $3^{rd}$ Generation Partnership Project; Technical Specification Group Radio Access Network; Radio Resource Control (RRC); Protocol specification (Release 10).
3GPP TS 23.272 v10.5.0 (Sep. 2011) $3^{rd}$ Generation Partnership Project; Technical Specification Group Services and System Aspects; Circuit Switched (CS) fallback in Evolved Packet System (EPS); Stage 2 (Release 10).
"Access Control for Inbound Handover from 3G Marco Cell to 3G HNB Cell" Seoul, Korea, Mar. 23-26, 2009, Meeting #63bis, R3-090752.
Berlemann L, et al., "A Flexible Protocol Stack for Multi-Mode Convergence in a Relay-based Radio Network Architecture", Personal, Indoor and Mobile Radio Communications, 2005, PIMRC 2005. IEEE 16th International Symposium, Berlin, Germany, Sep. 11-14, 2005, Piscataway, NJ, USA, IEEE, vol. 2, Sep. 11, 2005, pp. 978-774.

* cited by examiner

COMMUNICATION SYSTEM

TECHNICAL FIELD

The present invention relates to mobile telecommunication networks and to parts thereof, particularly but not exclusively networks operating according to the 3rd Generation Partnership Project (3GPP) standards or equivalents or derivatives thereof. The invention has particular although not exclusive relevance to mobility procedures between home base stations and the application of access control procedures and/or membership verification during such procedures.

BACKGROUND ART

Under the 3GPP standards, a NodeB (or an eNB in Long Term Evolution (LTE) standards) is a base station via which mobile devices connect to the core network. Such base stations are designed to cover a relatively large area and are often referred to as 'macro' base stations to distinguish them from base stations designed to cover a smaller area.

The 3GPP standards body has also adopted an official architecture and started work on a standard for so called 'home' base stations to provide short range 3G radiofrequency (RF) coverage. Where the home base station is operating to provide a UMTS (Universal Mobile Telecommunications System) Terrestrial Radio Access Network (UTRAN) type cell, the home base station is sometimes referred to as an HNB. Where the home base station is operating in accordance with the (Long Term Evolution) LTE standards to provide an LTE or evolved UTRAN (E-UTRAN) cell, the home base station is sometimes referred to as an HeNB. A similar architecture will also be applied in the WiMAX network. In this case, the home base station is commonly referred to as a femto cell. For simplicity, the present application will use the term HeNB to refer to any LTE home base station, the term HNB to refer to UMTS/UTRAN home base stations, and the term home base station generically to refer to HNB, HeNBs or other such base stations. Each home base station will provide radio coverage (for example, 3G/4G/WiMAX) within the home, small and medium enterprise, shopping Malls etc. and will connect to the core network via a public or corporate broadband access network (for example via an ADSL link to the Internet) and in the case of the 3GPP standards, via an optional home base station gateway (HNB-GW) which typically will aggregate traffic from several home base stations. The home base station may also connect to the access network via a suitable residential gateway (RGW).

The functionality of a home base station is often provided by a so called 'femto access point' (FAPs) and the term 'home base station' and 'femto access point' are often used interchangeably. An FAP can comprise a single mode FAP which provides the functionality of a single home base station operating a cell of a particular radio access technology (e.g. UTRAN or E-UTRAN). An FAP can also comprise a dual mode (or possibly multimode) FAP which provides the functionality of two (or possibly more) home base stations each effectively operating a cell of a different radio access technology (e.g. a UTRAN cell and an E-UTRAN cell).

In order to provide for mobility from one cell of the communications network to another, each FAP has a network monitor mode (NMM) functionality that allows it to scan for neighbouring cells and to place information, such as cell IDs or the like, relating to the neighbouring cells detected during the scan into a neighbour table or database at the FAP.

Typically, when initiating a call, user equipment (UE) such as a mobile telephone (MT) or other mobile communications device (MCD) will register either with a home base station or a macro base station based on, for example, the ability of that base station to support the call relative to other base stations in the vicinity. Once the call is initiated, it sometimes becomes necessary to relocate the call to another base station, using a 'mobility' procedure, due to a change in the relative ability of the original base station to continue to support the call, for example as a result of a change in the location of the mobile communication device or other factors which affect the quality of service offered by the original base station.

Each home base station may be configured to operate using one of a plurality of access modes, namely: 'closed' in which the home base station operates as a closed subscriber group (CSG) cell; 'hybrid' in which the home base station operates as a CSG cell where at the same time, non-CSG members are allowed access (for example, to allow preferential treatment of CSG members); and 'open' in which the home base station operates as a normal (non-CSG) cell.

Referring to FIG. 5, which is a timing diagram for a typical handover procedure, when a mobility procedure is initiated to handover/redirect a mobile communication device from one base station (a 'source' home base station in the example) to a second 'target' home base station a check will be made, at the target home base station, as to whether sufficient resources are available to support the mobile communication device. When the mobility procedure is initiated, access control and/or membership verification may also be performed in dependence on the access mode of the target home base station. In the case of a UMTS/UTRAN access control and/or membership verification may be performed by the HNB-GW, the target HNB and/or the core network. In the case of LTE/E-UTRAN access control and/or membership verification may be performed by a mobility management entity (MME) and/or a target HeNB.

The resource checking and access control/membership verification procedures can be relatively time consuming and can therefore cause an undesirable delay before the mobile communication device can be used for communication purposes. Moreover, if insufficient communication resources are available to support the mobile communication device and/or access control/membership verification fails then the mobility procedure is rejected and a failure indication is propagated back to the source home base station which then has to attempt handover of the mobile communication device to another base station (home or macro). This results in further delay and additional energy consumption.

DISCLOSURE OF THE INVENTION

Accordingly, there is a need for a communication system in which one or more of the above issues is overcome or at least ameliorated.

According to one aspect of the present invention, there is provided a communication system comprising: a communication network comprising a plurality of communication cells, a plurality of mobile communication devices each operable to connect into the communication network via at least one of said communication cells, and communication apparatus for providing at least one of said communication cells, wherein the communication apparatus comprises: a first base station component for providing a first communication cell via which a mobile communication device can connect to a communication network wherein the first base station component comprises: means for obtaining information, associated with a second base station component, for use in determining whether or not an attempt to transfer communication of a mobile communication device to a second communication cell provided by the second base station component is likely to be successful wherein said information comprises at least one of: (a) load information for use in determining whether sufficient resources are available at the second base station component for supporting communication by said mobile communication device; and (b) access control information for use in determining whether said mobile communication device will be allowed access to communicate using the second base station component; and means for determining whether or not an attempt to transfer communication of a mobile communication device to the second communication cell of said second base station component is likely to be successful based on said obtained information.

According to one aspect of the present invention, there is provided communication apparatus for providing at least one communication cell, the communication apparatus comprising: a first base station component for providing a first communication cell via which a mobile communication device can connect to a communication network wherein the first base station component comprises: means for obtaining information, associated with a second base station component, for use in determining whether or not an attempt to transfer communication of a mobile communication device to a second communication cell provided by the second base station component is likely to be successful wherein said information comprises at least one of: (a) load information for use in determining whether sufficient resources are available at the second base station component for supporting communication by said mobile communication device; and (b) access control information for use in determining whether said mobile communication device will be allowed access to communicate using the second base station component; and means for determining whether or not an attempt to transfer communication of a mobile communication device to the second communication cell of said second base station component is likely to be successful based on said obtained information.

The communication apparatus may comprise means for initiating a mobility procedure for transferring said communication of the mobile communication device connected via said first communication cell, to another communication cell, in dependence on the result of said determination by said determining means. The mobility procedure initiating means may be operable, when said transfer attempt is determined to be likely to be successful, to initiate a mobility procedure for transferring said communication of the mobile communication device connected via said first communication cell to the second communication cell. The mobility procedure initiating means may be operable, when said transfer attempt is determined not to be likely to be successful, to initiate a mobility procedure for transferring said communication of the mobile communication device connected via said first communication cell to a communication cell other than said second communication cell. The mobility procedure initiating means may be operable to initiate said mobility procedure by transmitting, to the mobile communication device that is to be transferred, a message specifying a frequency band of a target cell for said transfer.

The communication apparatus may comprise means for comparing a frequency band used by said second cell with each frequency band respectively used by at least one other communication cell neighbouring the second communication cell.

The mobility procedure initiating means may be operable, when said transfer attempt is determined not to be likely to be successful and at least one frequency band used by said at least one other communication cell is found, by said comparing means, to be different to said frequency band used by said second cell, to initiate a mobility procedure using said message, wherein the message specifies the frequency band of the target cell to be at least one frequency band different to said frequency band used by said second cell.

The mobility procedure initiating means may be operable, when said transfer attempt is determined not to be likely to be successful and no frequency band used by said at least one other communication cell is found, by said comparing means, to be different to said frequency band used by said second cell, to initiate a mobility procedure to blindly transfer said mobile communication device to any other neighbouring cell.

The mobility procedure initiating means may be operable, when said transfer attempt is determined to be likely to be successful, to initiate a mobility procedure using said message, wherein the message specifies the frequency band of the target cell to be the frequency band used by said second cell. The message may comprise a radio resource control (RRC) message such as a RRC connection release message.

The information obtained by said obtaining means may comprise load information for use in determining whether sufficient resources are available at the second base station component for supporting communication by said mobile communication device. The load information may comprise a congestion status for said second base station component.

The information obtained by said obtaining means may comprise access control information for use in determining whether said mobile communication device will be allowed to access to communicate using the second base station component. The access control information may comprise at least one of: an access mode and a closed subscriber group identity.

The first base station component may further comprise means for determining, for a mobile communication device connected via the first communication cell, a membership status of that mobile communication device in a closed subscriber group associated with the second base station component.

The membership status determining means may be operable to determine a membership status from historical data identifying if at least one previous attempt to transfer the mobile communication device connected via the first communication cell to the second communication cell has been successful or unsuccessful.

The membership status determining means may be operable to determine a membership status by transmitting a message to a further communication device requesting the information.

The means for determining whether or not an attempt to transfer communication is likely to be successful may be operable to determine whether a transfer of communication comprising a circuit switched fallback (CSFB) procedure to said second cell is likely to be successful based on said obtained information.

The communication apparatus my further comprise: means for initiating a mobility procedure for allowing or prohibiting CSFB to said second cell based on said determination as to whether or not said CSFB to said second cell is likely to be successful.

The communication apparatus my further comprise means for acquiring system information for use in said CSFB procedure while the first base station component is in a network monitor mode (NMM).

The communication apparatus my further comprise means for acquiring system information for use in said CSFB procedure via an operation administration and maintenance (OAM) interface.

The communication apparatus my further comprise means for acquiring system information for use in said CSFB procedure using a Self Organizing Network (SON) Transfer mechanism.

The communication apparatus my further comprise means for indicating a user or operator preference for a mobile communication device to use the first communication cell of the first base station component or the second communication cell of the second base station component in preference to other cells.

The communication apparatus my further comprise means for identifying a target cell for said CSFB procedure based on measurements acquired while the first base station component is in a network monitor mode (NMM).

The communication apparatus my further comprise means for identifying a target cell for said CSFB procedure based on an operation administration and maintenance (OAM) configuration.

The communication apparatus my further comprise the second base station component for providing said second communication cell via which a mobile communication device can connect to a communication network.

The second base station component may comprise: means for obtaining information, associated with the first base station component, for use in determining whether or not an attempt to transfer communication of a mobile communication device to the first communication cell provided by the first base station component is likely to be successful wherein said information comprises at least one of: (a) load information for use in determining whether sufficient resources are available at the first base station component for supporting communication by said mobile communication device; and (b) access control information for use in determining whether said mobile communication device will be allowed access to communicate using the first base station component; and means for determining whether or not an attempt to transfer communication of a mobile communication device to the first communication cell of said first base station component is likely to be successful based on said obtained information.

The first base station component may comprise one of a Universal Mobile Telecommunications System (UMTS) based home base station (HNB) and a Long Term Evolution (LTE) based home base station (HeNB).

The second base station component may comprises one of a Universal Mobile Telecommunications System (UMTS) based home base station (HNB) and a Long Term Evolution (LTE) based home base station (HeNB).

The first communication cell may operate using at least one of a Long Term Evolution (LTE) based radio access technology and a Universal Mobile Telecommunications System (UMTS) based radio access technology.

The second communication cell may operate using at least one of a Long Term Evolution (LTE) based radio access technology and a Universal Mobile Telecommunications System (UMTS) based radio access technology.

The radio access technology that the first communication cell operates using may be different to the radio access technology that the second communication cell operates using.

The radio access technology that the first communication cell operates using may be the same as the radio access technology that the second communication cell operates using, and the frequency band that the first communication cell operates using may be different to the frequency band that the second communication cell operates using.

The communication apparatus may comprise a femto access point.

According to one aspect of the present invention, there is provided a method performed by communication apparatus comprising a first base station component for providing a first communication cell via which a mobile communication device can connect to a communication network the method comprising said base station component: obtaining information, associated with a second base station component, for use in determining whether or not an attempt to transfer communication of a mobile communication device to a second communication cell provided by the second base station component is likely to be successful wherein said information comprises at least one of: (a) load information for use in determining whether sufficient resources are available at the second base station component for supporting communication by said mobile communication device; and (b) access control information for use in determining whether said mobile communication device will be allowed access to communicate using the second base station component; and determining whether or not an attempt to transfer communication of a mobile communication device to the second communication cell of said second base station component is likely to be successful based on said obtained information.

According to one aspect of the present invention, there is provided communication apparatus for providing at least one communication cell, the communication apparatus comprising: a first base station component for providing a first communication cell via which a mobile communication device can connect to a communication network wherein the first base station component comprises: means for obtaining information, associated with a second base station component, for use in determining whether or not an attempt to transfer a mobile communication device to a second communication cell provided by the second base station component is likely to be successful; and means for determining whether or not an attempt to transfer communication of a mobile communication device to the second communication cell of said second base station component is likely to be successful based on said obtained information.

According to one aspect of the present invention, there is provided a method performed by communication apparatus comprising a first base station component for providing a first communication cell via which a mobile communication device can connect to a communication network the method comprising said base station component: obtaining information, associated with a second base station component, for use in determining whether or not an attempt to transfer communication of a mobile communication device to a second communication cell provided by the second base station component is likely to be successful; and determining whether or not an attempt to transfer communication of a mobile communication device to the second communication cell of said second base station component is likely to be successful based on said obtained information.

According to one aspect of the present invention, there is provided a communication system comprising: a communication network comprising a plurality of communication cells, a plurality of mobile communication devices each operable to connect into the communication network via at least one of said communication cells, and communication apparatus according to any of the above aspects.

According to one aspect of the present invention, there is provided a mobile communication device forming part of the communication system according to an above aspect.

According to one aspect of the present invention, there is provided a mobile communication device operable to connect to a communication cell provided by communication apparatus comprising a first base station component for providing a first communication cell via which a mobile communication device can connect to a communication network wherein the first base station component comprises: means for obtaining information, associated with a second base station component, for use in determining whether or not an attempt to handover a mobile communication device to a second communication cell provided by the second base station component is likely to be successful wherein said information comprises at least one of: (a) load information for use in determining whether sufficient resources are available at the second base station component for supporting communication by said mobile communication device; and (b) access control information for use in determining whether said mobile communication device will be allowed access to communicate using the second base station component; and means for determining whether or not an attempt to transfer communication of a mobile communication device to the second communication cell of said second base station component is likely to be successful based on said obtained information.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Although for efficiency of understanding for those of skill in the art, the invention will be described in detail in the context of a 3G system (UMTS, LTE), the principles of the invention can be applied to other systems (such as GSM, CDMA200, WiMAX) in which mobile devices or User Equipment (UE) communicate with one of several base stations with the corresponding elements of the system changed as required.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE DRAWINGS

Embodiments of the invention will now be described by way of example only with reference to the attached figures in which.

DETAILED DESCRIPTION OF EXEMPLARY EMBODIMENTS (Overview)

Figure 1:
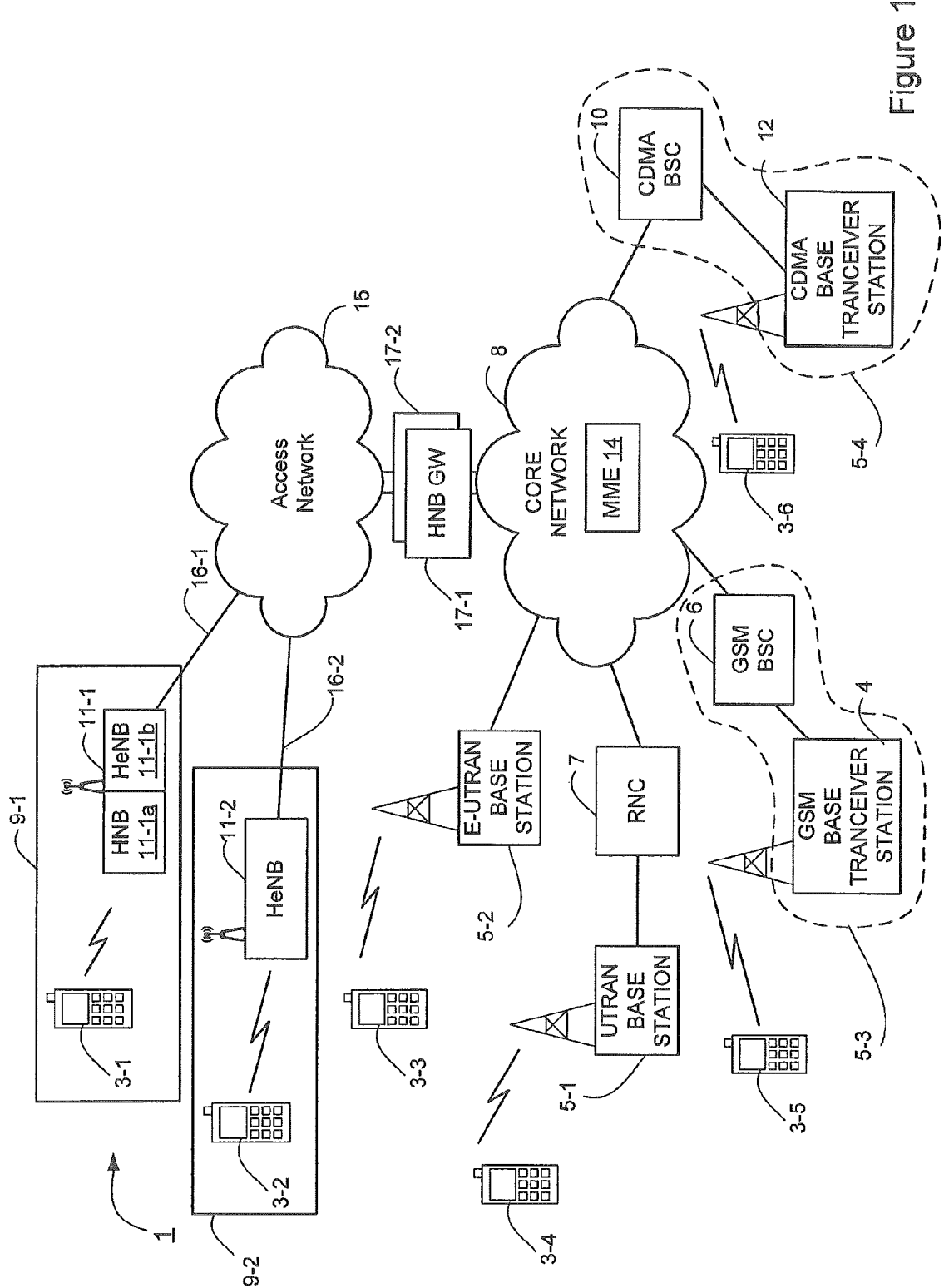
FIG. 1 schematically illustrates a mobile (cellular) telecommunication system.

FIG. 1 schematically illustrates a mobile (cellular) telecommunication system 1 in which users of mobile telephones 3-1 to 3-6 can communicate with other users via different access nodes operating using different radio access technologies (RATs). In particular, mobile communication devices 3 (or other user equipment) can make connections with a core network 8 directly via a macro cell of: a '3G' UMTS (Universal Mobile Telecommunications System) Terrestrial Radio Access Network (UTRAN) base station 5-1 and associated Radio Network Controller (RNC) 7; an evolved UTRAN (E-UTRAN) base station 5-2; a '2G' Global System for Mobile Communications (GSM) base station 5-3 comprising a GSM base transceiver station (BTS) 4 and GSM base station controller (BSC) 6; and/or a '2G' Code Division Multiple Access (CDMA) base station 5-4 comprising a CDMA base transceiver station (BTS) 12 and CDMA base station controller (BSC) 10.

Mobile communication devices 3 may also connect to the core network 8 via a cell of a respective femto access point (FAP) 11-1 and 11-2 provided in a user's commercial or private residence 9. In FIG. 1 the FAPs comprise a single mode FAP 11-2 and a dual mode FAP 11-1. In this embodiment, the single mode FAP 11-2 provides a single long term evolution (LTE)/E-UTRAN supporting femtocell. The dual mode FAP 11-1 effectively provides a dual femtocell that supports both LTE/E-UTRAN and UTRAN. The single mode FAP 11-2 comprises an E-UTRAN supporting 'home' base station (HeNB) whilst the dual mode FAP 11-1 comprises an E-UTRAN supporting 'home' base station (HeNB) 11-1b and a UTRAN supporting 'home' base station (HNB) 11-1a.

In the telecommunication system 1, the LTE based base stations are supported by an LTE control-node comprising a Mobility Management Entity (MME) 14.

The FAPs 11 are each connected to the core network 8 via a suitable Internet connection such as the ADSL or cable connection 16-1, 16-2, an access network 15 (which in this embodiment comprises a broadband access network conforming to the BroadBand Forum, BBF), and (in this embodiment) a respective home base station gateway (HNB-GW) 17-1, 17-2. Each FAP 11 is programmed with the IP address of the respective HNB-GW 17-1, 17-2 so that all uplink communications are transmitted via the respective HNB-GW 17-1, 17-2. As those skilled in the art will appreciate, each FAP 11 can communicate with a number of different mobile communication devices 3. It will be appreciated that there may be any number of home base station based cells and that the same HNB-GW 17 may be shared by the home base stations of a plurality of FAPs 11.

The telecommunication system 1 is configured to support mobility between cells including relocation of a mobile communication device 3 from a macro cell to one of the home base station based cells of an FAP 11 (and vice versa), relocation between the home base station based cells of one FAP and another, and relocation between the home base station based cells of a single dual mode FAP 11-1.

In the example illustrated in FIG. 1, mobile telephone 3-1 is connected to the core network 8 via the single mode FAP (HeNB) 11-2; the mobile telephone 3-2 is connected to the core network 8 via the dual mode FAP (HeNB/HNB) 11-1; mobile telephone 3-3 is connected to the core network 8 via E-UTRAN base station 5-2; mobile telephone 3-4 is connected to the core network 8 via UTRAN base station 5-1; mobile telephone 3-5 is connected to the core network 8 via GSM base station 5-3; and mobile telephone 3-6 is connected to the core network 8 via CDMA base station 5-4.

Each FAP 11 is operable in a network monitor mode (NMM) in which the FAP 11 can detect signals transmitted by other, neighbouring, access points, to capture the identities of the neighbouring access points and to populate a neighbour table with details of the neighbouring cells that can be used, for example, to support handover of a mobile communication device 3 between cells. The NMM is initiated during a self configuration process when the FAP 11 is first set up and periodically thereafter in order to maintain an accurate and up-to-date neighbour table. The NMM scanning is performed via the home base station function(s) of the FAP 11 performing the NMM process.

Advantageously, each home base station 11-1a, 11-1b of the dual mode FAP 11-1 is able to acquire and store load related information representing the congestion status of the coexisting home base station 11-1b, 11-1a of the dual mode FAP. The dual mode FAP 11-1 is also able to acquire and store information, such as access control parameters, related to the acceptability of the handover of the mobile communication device 3 to the coexisting home base station 11-1b, 11-1a of the dual mode FAP.

On detection of a trigger for a mobility procedure, each home base station 11-1a, 11-1b is able to determine, based on the acquired information, as to whether or not handover to the coexisting home base station 11-1b, 11-1a of the dual mode FAP is likely to be successful. Each home base station 11-1a, 11-1b is thus beneficially able to make an informed decision based on this determination as to whether or not to attempt a handover to the coexisting home base station 11-1b, 11-1a. Accordingly, an inability to handover to the coexisting home base station 11-1b, 11-1a is detected earlier in the mobility procedure thereby avoiding unnecessary signalling and ensuring that the mobile communication device 3 is handed over to another base station sooner.

(Dual Mode Femto Access Point)

Figure 2:
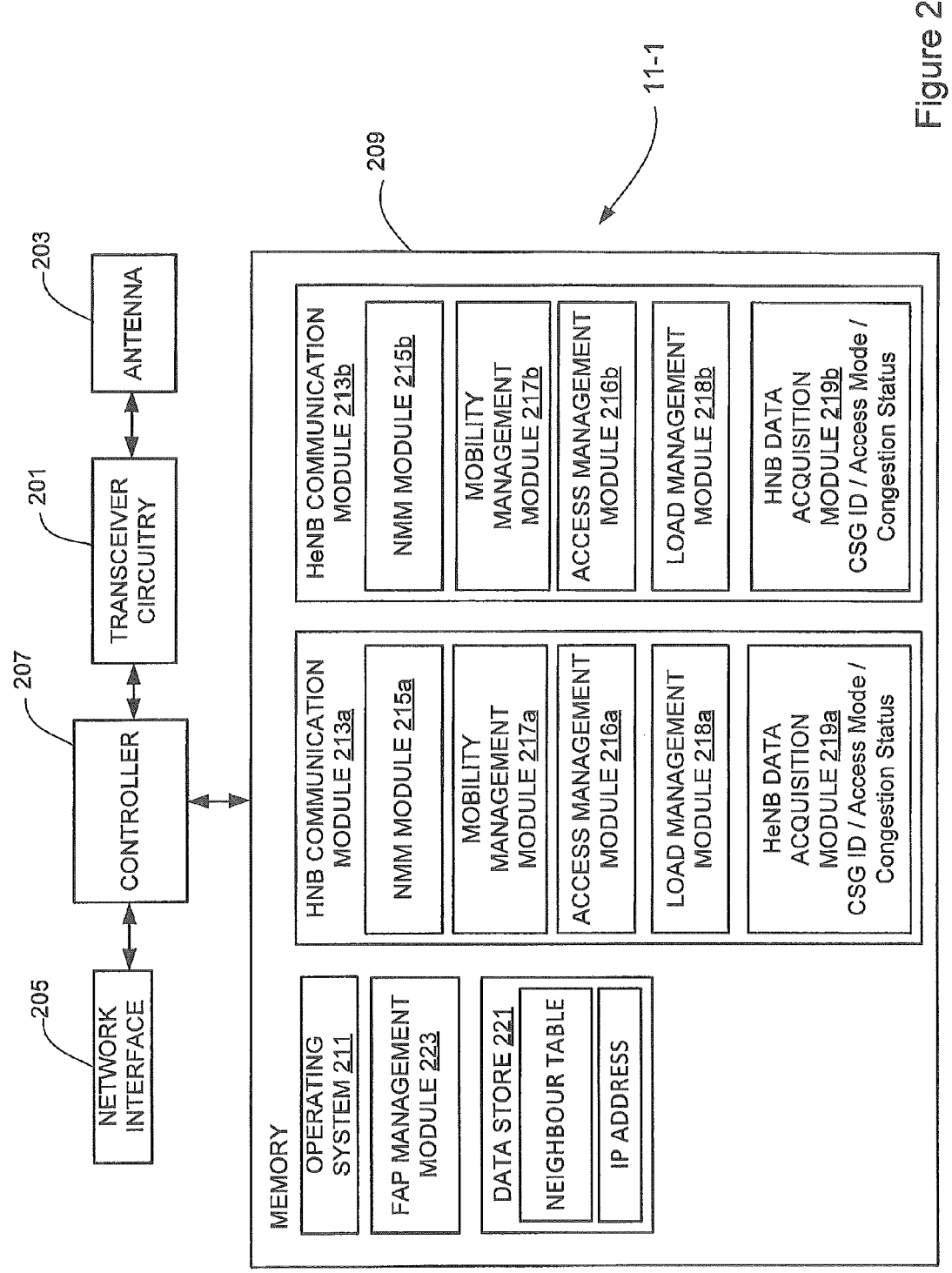
FIG. 2 is a block diagram illustrating the main components of the dual mode Femto Access Point (FAP) of the telecommunication system of FIG. 1.

FIG. 2 is a block diagram illustrating the main components of the dual mode Femto Access Point (FAP) 11-1 shown in FIG. 1. As shown, the dual mode FAP 11-1 includes transceiver circuitry 201 which is operable to transmit signals to, and to receive signals from, mobile communication devices 3 or other user equipment via one or more antennas 203 and which is operable to transmit signals to and to receive signals from the core network 8 via the access network 15 and a network interface 205. The operation of the transceiver circuitry 201 is controlled by a controller 207 in accordance with software stored in memory 209. The software includes, among other things, an operating system 211 and an FAP management module 223. The software also includes two home base station communication modules 213—an HNB communication module 213a and an HeNB communication module 213b. The memory 209 also holds a data store 221, where the HNB 11 stores, among other things, an IP address that is assigned to the FAP, and a neighbour table.

The FAP management module 223 manages the operation of the dual mode FAP and, in particular, coordinates the operation of each home base station 11-1a, 11-1b.

The HNB communication module 213a provides the communication functions of a UTRAN/UMTS home base station, thereby providing the HNB 11-1a of the dual mode FAP 11-1. The HeNB communication module 213b provides the communication functions of an E-UTRAN/UMTS home base station, thereby providing the HeNB 11-1b of the dual mode FAP 11-1.

Each home base station communication module 213a, 213b comprises a respective NMM module 215a, 215b, mobility management module 217a, 217b, access management module 216a, 216b, load management module 218a, 218b, and data acquisition module 219a, 219b.

Each NMM module 215a, 215b handles operation of its respective home base station 11-1a, 11-1b in a respective network monitor mode to identify information relating to neighbouring communication cells (including overlapping cells) for populating the neighbour table of the dual mode FAP 11-1. Each mobility management module 217a, 217b manages operation of its respective home base station 11-1a, 11-1b during mobility procedures such as handover/redirection procedures during forced handover, circuit switched fall back, roaming and or the like. Each access management module 216a, 216b maintains access control parameters such as access mode, closed subscriber group identity (CSG ID) and access mode, for its respective home base station 11-1a, 11-1b. Each access management module 216a, 216b, also manages operation of its respective home base station 11-1a, 11-1b during procedures related to access control such as access control itself, membership verification, validation of CSG IDs or the like. Each load management module 218a, 218b, manages operation of its respective home base station 11-1a, 11-1b to monitor it congestion status and to take congestion avoidance/reduction actions such as rejecting attempts to register in an over-congested cell of the home base station.

The respective data acquisition module 219a, 219b of each home base station communication module 213a, 213b is operable to acquire data from the coexisting home base station 11-1b, 11-1a including, for example, the congestion status, access mode and closed subscriber group identity of the coexisting home base station 11-1b, 11-1a. Specifically, the data acquisition module 219a of the HNB communication module 213a acquires data associated with HeNB 11-1a and the data acquisition module 219b of the HeNB communication module 213b acquires data associated with HNB 11-1a. The acquired data is thus available for use during handover/redirection procedures to avoid unsuccessful attempts to handover a mobile communication device 3 from one home base station 11-1a to the other, coexisting, home base station 11-1b.

(Operation)

Operation of the dual mode FAP 11-1 will now be described, by way of example only, with reference to FIGS. 4 and 5.

Forced Handover

Figure 3:
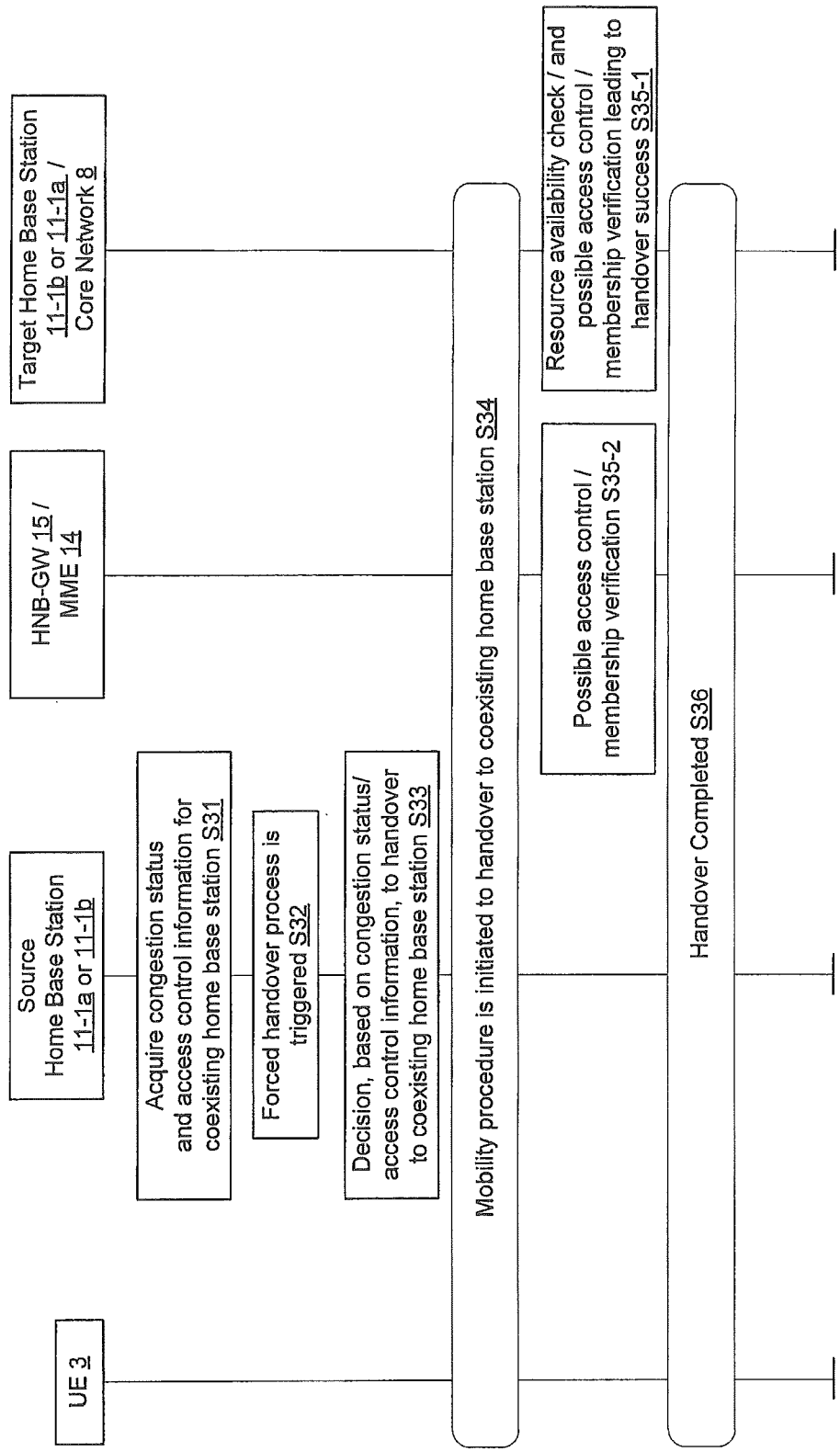
FIG. 3 is a simplified timing diagram illustrating operation of the dual mode FAP of FIG. 1.

FIG. 3 is a simplified timing diagram for a typical handover procedure performed by the dual mode FAP. FIG. 3 illustrates operation during a so called 'forced' handover procedure in which handover is triggered when a current communication cell is no longer able to support ongoing communication for a particular connected mobile communication device 3 (for example because of an inability to maintain a required quality of service (QoS) or the like).

As seen in FIG. 3, prior to a handover process being triggered, each home base station 11-1a, 11-1b of the dual mode FAP 11-1 acquires access control information (e.g. CSG ID and/or access mode) and load information (e.g. congestion status) associated with the coexisting home base station 11-1b, 11-1a at S31. Thus, when a handover is triggered at S32 at one home base station 11-1a, 11-1b (referred to as the 'source'), rather than immediately initiating a mobility procedure to attempt a handover to the coexisting home base station 11-1b, 11-1a (as the 'target'), the source home base station 11-1a, 11-1b first determines, at S33, whether handover to the coexisting home base station 11-1b, 11-1a is likely to be successful based on the acquired access control and load information at S32. The determination made by the source home base station 11-1a, 11-1b may also be based on the home base station's knowledge of its own access mode, CSG ID and/or membership status for a connected mobile communication device 3, for example as represented in Table 1 below:

TABLE 1

| Source Home Base Station Characteristics | | | Target Home Base Station Characteristics | | | Apparent | |
| --- | --- | --- | --- | --- | --- | --- | --- |
| Access mode | CSG-ID | Membership status | Access mode | CSG-ID | Membership status | Congestion status | Preferred target chosen by source |
| Closed | #A | N/A | Closed | #A | N/A | Uncongested | Co-existing HNB |
| Closed | #A | N/A | Closed | #B | N/A | Uncongested | Prohibit co-existing HNB and select another cell such as Macro cell or open/hybrid cell |
| Closed | #A | N/A | Hybrid | #A | Probably member | Uncongested | Co-existing HNB |
| Closed | #A | N/A | Hybrid | #B | Cannot be estimated | Uncongested | Co-existing HNB |
| Closed | #A | N/A | Open | N/A | N/A | Uncongested | Co-existing HNB |
| Hybrid | #A | member | Closed | #A | N/A | Uncongested | Co-existing HNB |
| Hybrid | #A | member | Closed | #B | N/A | Uncongested | Prohibit co-existing HNB and selects the other cell such as Macro cell or open/hybrid cell |
| Hybrid | #A | member | Hybrid | #A | Probably, member | Uncongested | Co-existing HNB |
| Hybrid | #A | member | Hybrid | #B | Cannot be estimated | Uncongested | Co-existing HNB |
| Hybrid | #A | member | Open | N/A | N/A | Uncongested | Co-existing HNB |
| Hybrid | #A | non-member | Closed | #A | N/A | Uncongested | Prohibit co-existing HNB and selects the other cell such as Macro cell or open/hybrid cell |
| Hybrid | #A | non-member | Closed | #B | N/A | Uncongested | Prohibit co-existing HNB and selects the other cell such as Macro cell or open/hybrid cell |
| Hybrid | #A | non-member | Hybrid | #A | Probably, non-member | Uncongested | Co-existing HNB |
| Hybrid | #A | non-member | Hybrid | #B | Cannot be estimated | Uncongested | Co-existing HNB |
| Hybrid | #A | non-member | Open | N/A | N/A | Uncongested | Co-existing HNB |
| Open | N/A | N/A | Closed | Don't Care | N/A | Uncongested | Prohibit co-existing HNB and selects the other cell such as (Macro cell or open/hybrid cell |
| Open | N/A | N/A | Hybrid | Don't Care | Cannot be estimated | Uncongested | Co-existing HNB |
| Open | N/A | N/A | Open | N/A | N/A | Uncongested | Co-existing HNB |
| Closed | #A | N/A | Closed | #A | N/A | Congested | Prohibit co-existing HNB and select another cell such as Macro cell or open/hybrid cell |
| Closed | #A | N/A | Closed | #B | N/A | Congested | Prohibit co-existing HNB and select another cell such as Macro cell or open/hybrid cell |
| Closed | #A | N/A | Hybrid | #A | Probably, member | Congested | Prohibit co-existing HNB and select another cell such as Macro cell or open/hybrid cell |
| Closed | #A | N/A | Hybrid | #B | Cannot be estimated | Congested | Prohibit co-existing HNB and select another cell such as Macro cell or open/hybrid cell |

TABLE 1-continued

| Source Home Base Station Characteristics | | | Target Home Base Station Characteristics | | | Apparent | |
|---|---|---|---|---|---|---|---|
| Access mode | CSG-ID | Membership status | Access mode | CSG-ID | Membership status | Congestion status | Preferred target chosen by source |
| Closed | #A | N/A | Open | N/A | N/A | Congested | Prohibit co-existing HNB and select another cell such as Macro cell or open/hybrid cell |
| Hybrid | #A | member | Closed | #A | N/A | Congested | Prohibit co-existing HNB and select another cell such as Macro cell or open/hybrid cell |
| Hybrid | #A | member | Closed | #B | N/A | Congested | Prohibit co-existing HNB and select another cell such as Macro cell or open/hybrid cell |
| Hybrid | #A | member | Hybrid | #A | Probably, member | Congested | Prohibit co-existing HNB and select another cell such as Macro cell or open/hybrid cell |
| Hybrid | #A | member | Hybrid | #B | Cannot be estimated | Congested | Prohibit co-existing HNB and select another cell such as Macro cell or open/hybrid cell |
| Hybrid | #A | member | Open | N/A | N/A | Congested | Prohibit co-existing HNB and select another cell such as Macro cell or open/hybrid cell |
| Hybrid | #A | non-member | Closed | #A | N/A | Congested | Prohibit co-existing HNB and select another cell such as Macro cell or open/hybrid cell |
| Hybrid | #A | non-member | Closed | #B | N/A | Congested | Prohibit co-existing HNB and select another cell such as Macro cell or open/hybrid cell |
| Hybrid | #A | non-member | Hybrid | #A | Probably, non-member | Congested | Prohibit co-existing HNB and select another cell such as Macro cell or open/hybrid cell |
| Hybrid | #A | non-member | Hybrid | #B | Cannot be estimated | Congested | Prohibit co-existing HNB and select another cell such as Macro cell or open/hybrid cell |
| Hybrid | #A | non-member | Open | N/A | N/A | Congested | Prohibit co-existing HNB and select another cell such as Macro cell or open/hybrid cell |
| Open | N/A | N/A | Closed | Don't Care | N/A | Congested | Prohibit co-existing HNB and select another cell such as Macro cell or open/hybrid cell |
| Open | N/A | N/A | Hybrid | Don't Care | Cannot be estimated | Congested | Prohibit co-existing HNB and select another cell such as Macro cell or open/hybrid cell |
| Open | N/A | N/A | Open | N/A | N/A | Congested | Prohibit co-existing HNB and select another cell such as Macro cell or open/hybrid cell |

Accordingly, as set out in the above table, for example, if the access mode of the coexisting home base station 3 is an 'open' or 'hybrid' access mode and it appears from the acquired congestion status that the coexisting home base station 3 is uncongested then the source home base station 11-1*a*, 11-1*b* determines that handover is likely to be successful at S33. If the coexisting home base station 3 appears to be uncongested, the access mode of the coexisting home base station 3 is 'closed', and the mobile communication device 3 is a member of the closed subscriber group represented by the CSG ID acquired for the coexisting home base station 11-1*b*, 11-1*a*, then the source home base station 11-1*a*, 11-1*b* also determines that handover is likely to be successful at S33. If, on the other hand, the coexisting home base station 3 appears to be uncongested, or if the access mode of the coexisting home base station 3 is 'closed' and the mobile communication device 3 is not a member of the closed subscriber group of the coexisting home base station 11-1*b*, 11-1*a* then the source home base station 11-1*a*, 11-1*b* determines that handover is unlikely to be successful at S33. If the coexisting home base station 3 appears to be congested then the source home base station 11-1*a*, 11-1*b* determines that handover is unlikely to be successful at S33.

If the source home base station 11-1*a*, 11-1*b* determines that handover is unlikely to be successful at S33 then no attempt is made to handover the mobile communication device 3 to the coexisting home base station 11-1*b*, 11-1*a*. Instead, if possible, the source home base station 11-1*a*, 11-1*b* attempts to ensure handover is made to a cell other than the cell of the coexisting home base station 11-1*b*, 11-1*a* (this situation is not represented in FIG. 3).

The timing diagram shown in FIG. 3 continues, for the situation in which the source home base station 11-1*a*, 11-1*b* determines that handover is likely to be successful at S33, with initiation of a mobility procedure to handover the mobile communication device to the coexisting home base station 11-1*b*, 11-1*a* at S34.

Thus when, at S35-1, the coexisting home base station 11-1*b*, 11-1*a* checks it resource availability and, if appropriate, performs any access control related procedures (such as membership verification/CSG ID validation) based on its access mode, the handover is more likely to be allowed than if the source home base station 11-1*a*, 11-1*b* had initiated the handover attempt arbitrarily. Similarly, when, at S35-2 the MME 14 or HNB-GW-15 performs any access control related procedures for the coexisting home base station 11-1*b*, 11-1*a*, access control is likely to be successful.

Handover is then successfully completed at S36.
Redirection Using an RRC CONNECTION RELEASE Message A handover of a mobile communication device 3 may be initiated by the home base station releasing the connection using a Radio Resource Control (RRC) message comprising an RRC Connection Release message or equivalent (e.g. as defined, in particular, in section 10.2.37 of 3GPP TS 25.331. The RRC CONNECTION RELEASE message contains a so called 'redirection info' information element that includes frequency band information for potential target cells to which a mobile communication device 3 may handover and may include E-UTRA Target Info' for a target E-UTRA system which may include a Physical Cell identity for a HeNB based cell, but does not include detailed cell level information that would ensure a mobile communication device 3 would handover to a specific individual cell.

Figure 4:
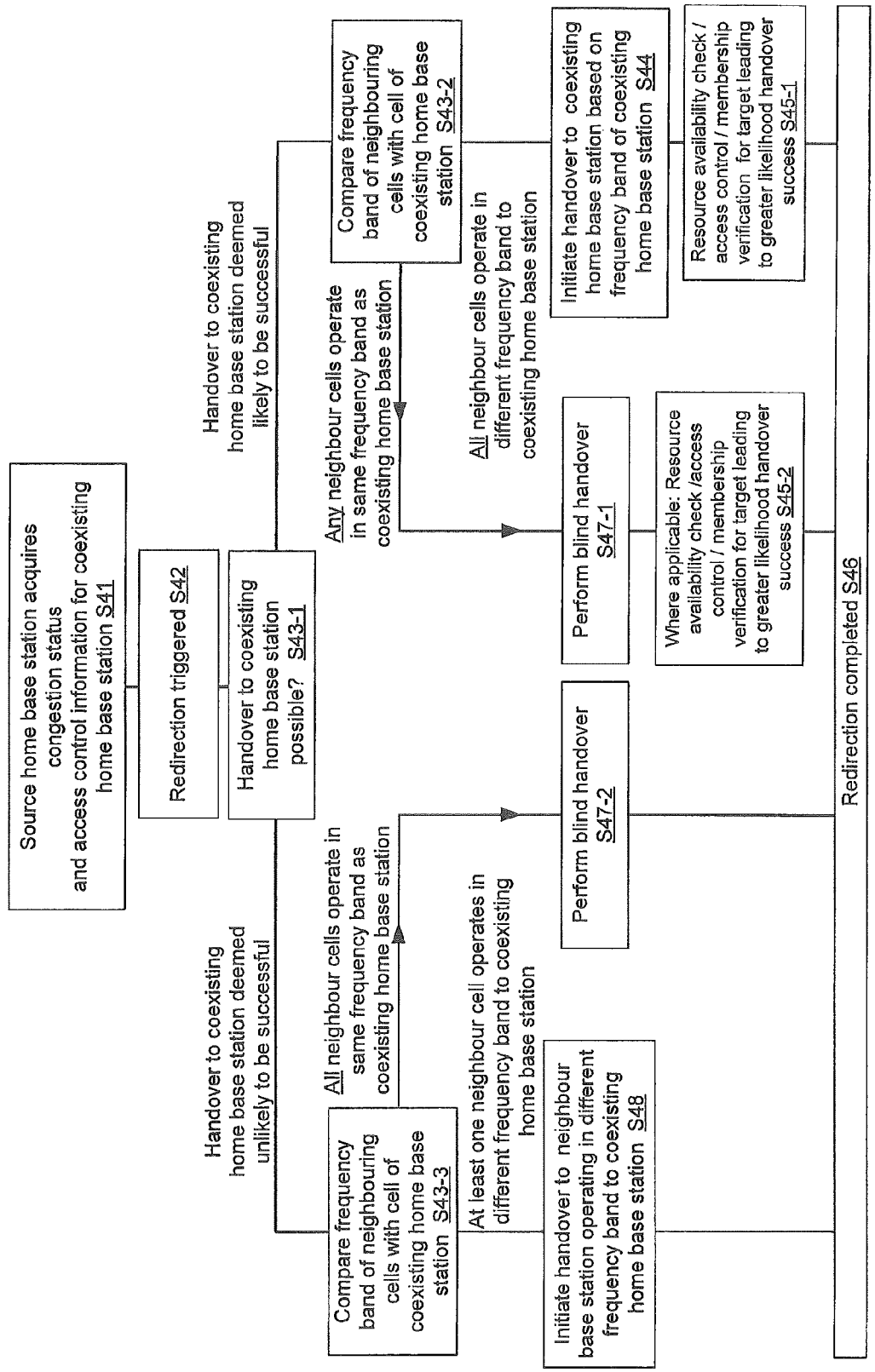
FIG. 4 is a flow chart illustrating operation of the dual mode FAP of FIG. 1.
Figure 5:
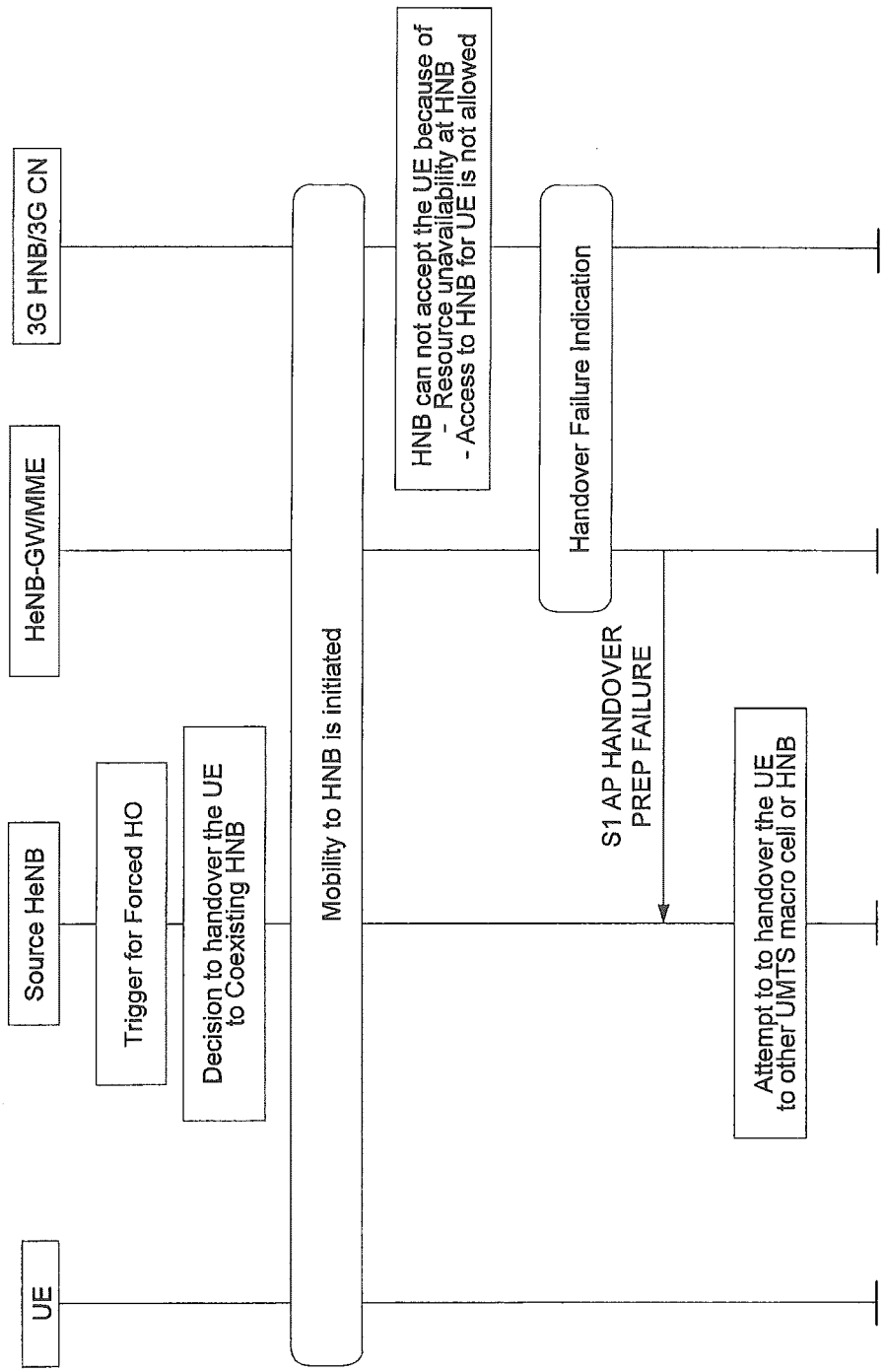
FIG. 5 is a simplified timing diagram illustrating a typical handover process according to the prior art.

FIG. 4 is a simplified timing diagram for another a handover procedure performed by the dual mode FAP in the case where the handover is performed as part of an RRC connection release initiated redirection from the cell of one home base station 11-1*a*, 11-1*b* to another. The procedure is particularly relevant, though not exclusive, to redirection from a HeNB 11-1*b* to a HNB 11-1*a* for which a cell identity id not available.

As seen in FIG. 4, when the dual mode FAP 11-1 prior to a handover process being triggered, each home base station 11-1*a*, 11-1*b* of the dual mode FAP 11-1 acquires access control information (e.g. CSG ID and/or access mode) and load information (e.g. congestion status) associated with the coexisting home base station 11-1*b*, 11-1*a* at S41. Thus, when redirection is triggered, at S42, in one of the home base station 11-1*a*, 11-1*b*, rather than immediately initiating a mobility procedure to attempt a handover to the coexisting home base station 11-1*b*, 11-1*a*, the source home base station 11-1*a*, 11-1*b* first determines, at S43-1, whether handover to the coexisting home base station 11-1*b*, 11-1*a* is considered possible based on the acquired access control and load information at S42.

If the source home base station 11-1*a*, 11-1*b* determines that handover is likely to be successful at S43-1 then, if possible, an attempt is made to handover the mobile communication device 3 directly to the coexisting home base station 11-1*b*, 11-1*a*. Specifically, at S43-2, the source home base station 11-1*a*, 11-1*b* compares the frequency bands of other neighbouring cells with that of the coexisting home base station 11-1*b*, 11-1*a*. If all the neighbour cells operate in a different frequency band to the coexisting home base station 11-1*b*, 11-1*a*, then handover is initiated, at S44, using an RRC CONNECTION RELEASE message in which the 'redirection info' information element is populated with frequency band information for the cell of the coexisting home base station 11-1*b*, 11-1*a*. If, on the other hand, any of the other neighbouring cells operate in the same frequency band as the coexisting home base station 11-1*b*, 11-1*a*, then a blind handover procedure is initiated, at S47-1, using an RRC CONNECTION RELEASE message in an attempt to handover blindly to a neighbouring cell which may comprise the cell of the coexisting home base station 11-1*b*, 11-1*a*.

Thus when, at S45-1 (or, if applicable, at S45-2), the coexisting home base station 11-1*b*, 11-1*a* checks it resource availability and performs any access control related procedures (if appropriate) such as membership verification/CSG validation, the handover is more likely to be allowed than if the source home base station 11-1*a*, 11-1*b* had initiated the handover attempt arbitrarily. As a skilled person will appreciate, the MME 14, HNB-GW 15 and/or Core Network may alternatively/additionally perform any access control related procedures for the coexisting home base station 11-1*b*, 11-1*a* at S45-1 or S45-2.

If the source home base station 11-1*a*, 11-1*b* determines that handover is unlikely to be successful at S43-1 then no attempt is made to handover the mobile communication device 3 specifically to the coexisting home base station 11-1*b*, 11-1*a*. Instead, if possible, the source home base station 11-1*a*, 11-1*b* attempts to ensure handover is made to a cell other than the cell of the coexisting home base station 11-1*b*, 11-1*a*. Specifically, at S43-3, the source home base station 11-1*a*, 11-1*b* compares the frequency bands of other neighbouring cells with that of the coexisting home base station 11-1*b*, 11-1*a*. If at least one neighbour cell operates in a different frequency band to the coexisting home base station 11-1*b*, 11-1*a*, then handover is initiated, at S48, using an RRC CONNECTION RELEASE message in which the 'redirection info' information element is populated with frequency band information for the neighbour cell that operates in a different frequency band to coexisting home base station 11-1*b*, 11-1*a*. If, on the other hand, all the other neighbour cells operate in the same frequency band as the coexisting home base station 11-1*b*, 11-1*a*, then a blind handover procedure is initiated, at S47, using an RRC CONNECTION RELEASE message in an attempt to handover blindly to a neighbouring macro cell.

The timing diagram shown in FIG. 3 continues, for the situation in which the source home base station 11-1*a*, 11-1*b* determines that handover is likely to be successful at S33, with initiation of a mobility procedure to handover the mobile communication device to the coexisting home base station 11-1*b*, 11-1*a* at S34.

Handover is then completed at S46.
Circuit Switched Fallback Procedures

It will be appreciated that UMTS based technology supports so called packet switched (PS) services and circuit switched (CS) services whereas LTE technology supports packet based services only. Accordingly, the 3GPP standards provide for so called circuit switched fallback (CSFB) procedures which allow a mobile communication device 3 that is connected via an LTE base station and that requests a CS based service to 'fallback' to another CS supporting base station in order to provide the requested service. The CSFB procedure therefore enables the provisioning of voice and traditional CS-domain services (e.g. CS Unrestricted Digital Information (UDI) video, Short Message Service (SMS), Location Service (LCS) and Unstructured Supplementary Service Data (USSD)) by allowing LTE to reuse the CS infrastructure even when the mobile communication device 3 is being served by an LTE based base station such as an HeNB. As those skilled in the art will appreciate, typical CSFB procedures for allowing mobile communication devices 3 to fallback from E-UTRAN to UTRAN may be found in 3GPP TS 23.272.

The dual mode FAP 11-1 supports CSFB so that a CSFB enabled mobile communication device 3, connected to the HeNB 11-1b of the dual mode FAP may thus use CSFB to successfully connect to the CS domain via the HNB 11-1a. The HeNB 11-1b is operable to perform CSFB in a number of different ways.

In one method, when a CSFB enabled mobile communication device 3, connected to the HeNB 11-1b makes a request for extended services requiring CSFB, the HeNB 11-1b initially co-ordinates with the MME 14 in pursuance of the attempt to fulfil the CSFB request using appropriate S1 application (S1-AP) signalling as set out in 3GPP TS 23.272 (e.g. to establish if the CSFB procedure needs priority handling). The HeNB 11-1b then initiates handover of the mobile communication device 3 that has made the request by initiating a release of the connection with the HeNB 11-1b using an RRC Connection Release message comprising redirection control information as described above with reference to FIG. 4.

In other methods, for example, the circuit switched fallback (CSFB) procedure may comprise redirection of a mobile communication using a redirection process which may require UMTS system information for the HNB (in the case of release 9 devices) or which may not require the UMTS system information for the HNB (in the case of release 8 devices).

The procedure to redirect the mobile communication device 3 to a CS service supporting base station then follows in a similar manner to that shown in, and described with reference to, FIG. 3 or FIG. 4 albeit that redirection is limited to cells of base stations, such as that of the HNB 11-1a, that support CS services. Thus, attempts to fallback to the HNB 11-1a are only made if the acquired information relating to congestion status and access control/CSG membership status, indicates that handover to the coexisting home base station 11-1b, 11-1a of the dual mode FAP is likely to be successful.

Accordingly, CSFB to HNB may be prohibited or preferred based on the load status of HNB.

Advantageously, therefore, an inability to fallback to the HNB 11-1a is detected earlier in the CSFB procedure thereby avoiding unnecessary signalling and ensuring that the mobile communication device 3 falls back to another CS service supporting base station sooner.

Further, the HeNB advantageously makes use of the NMM procedures in order to determine a signal strength for each of the UMTS cells in vicinity. Accordingly, the HeNB is able to select a UMTS cell for CSFB without requiring measurement reports from a mobile communication device 3. Advantageously, therefore, a target cell can be identified without requiring RRC signalling.

Moreover, an operator configurable flag is beneficially provided at the dual mode FAP 11 for indicating an operator, or end user preference, for a mobile communication device 3 to camp on the HeNB 11-1b or HNB 11-1a as much as possible (for example to minimise costs associated with communicating using a neighbouring cell). In the case of CSFB, when the flag is set to indicate that the mobile communication device 3 should camp on the HeNB 11-1b or HNB 11-1a as much as possible (e.g. the flag is set to ON or '1' or TRUE), then the HeNB ignores the congestion status of the HNB 11-1a and preferentially falls back to the HNB during CSFB.

During CSFB requiring system information, the HeNB 11-1b is advantageously able to acquire system information for the target UMTS cell (e.g. of the HNB 11-1a) from NMM measurements, over an internal operation administration and maintenance (OAM) interface in the dual mode FAP 11-1 and/or using an external Self Organizing Network (SON) Transfer mechanism.

Beneficially, by providing for UMTS System Information for the HNB to be obtained from a coexisting home base station function using an internal OAM based transfer mechanism, an external SON based transfer mechanism, or from measurements made in the NMM, if the HeNB 11-1b needs to perform a circuit switched fallback (CSFB) procedure via redirection to the HNB, the HeNB does not need to retrieve this system information using the current, signaling intensive, Radio Access Network (RAN Information Management (RIM) procedure via the core network 8. Accordingly, traffic towards the core network 8 can be reduced.

Access Control

Access management for the home base station 11-1a, 11-1b is carried out based on access management parameters for the home base station 11-1a, 11-1b and a CSG Subscription List/Access control list for the home base station 11-1a, 11-1b. The access management parameters comprise the closed subscriber group identification (CSG ID) and Access Mode (Open, Hybrid or Closed), and are provided by an auto configuration server (ACS) in accordance with technical report, TR-069, of the Broadband Forum. The CSG subscription/access control list is available from a Home Subscriber Server (HSS) or Home Location Register (HLR). In the case of the UMTS based home base station 11-1a the CSG subscription/access control list may also be made available in the HNB 11-1a and/or the HNB-GW 17.

If the access mode is 'open' then no access management is required and, accordingly, as long as sufficient resources are available, handover to the home base station will generally be allowed.

If the access mode is 'closed' then access control is required. In the case of the HeNB 11-b, the core access control procedure for the HeNB 11-b is carried out by the MME 14, with a CSG ID validation being carried out by the HeNB 11-b. Where access control is required for the HNB 11-a, access control procedures for the HNB 11-a may be carried out by the HNB 11-a, the HNB-GW 17 and/or a node of the core network 8.

If the access mode is 'hybrid' then membership verification is required. In the case of the HeNB 11-b, the membership verification procedure for the HeNB 11-b is carried out by the MME 14, with a CSG ID validation being carried out by the HeNB 11-b. Where membership verification is required for the HNB 11-a, the membership verification for the HNB 11-a may be carried out by the HNB 11-a, the HNB-GW 17 and/or a node of the core network 8.

In addition to access management (including access control and/or membership verification) being carried out during mobility procedures, access management is also carried out when a mobile communication device 3 attempts initial access to a cell of a home base station.

The access management parameters for both the HNB 11-1a and the HeNB 11-1b are provided to the dual mode FAP 11-1, by the ACS, when the FAP 11-1 is configured. Each home base station 11-1a, 11-1b is thus able to acquire the access management parameters for coexisting home base station 11-1b, 11-1a during the configuration process and are therefore available for use during any intra dual mode FAP mobility procedures from one cell of the dual mode FAP 11-1 to the other.

In this embodiment, the subscription status of a mobile communication device 3 by each home base station 11-1a, 11-1b for the coexisting home base station 11-1b, 11-1a is derived, when the mobile communication device connects to the home base station 11-1a, 11-1b, by transmitting an enquiry to the repository of the CSG subscription/access control list. The enquiry includes identification information for the mobile communication device 3 (e.g. its International Mobile Subscriber Identity (IMSI)) and the CSG ID (and optionally the Access Mode) of the coexisting home base station 11-1b, 11-1a. Thus, in response to the enquiry, the repository of the CSG subscription/access control list returns information on the membership status of the identified mobile communication device 3.

In this embodiment, the information on membership status for each mobile communication device 3 is maintained, by each home base station 11-1a, 11-1b, in a table (e.g. as illustrated in table 2 below):

TABLE 2

| IMSI (or instance identifier) of mobile communication device | Membership status of mobile communication device for coexisting home base station |
| --- | --- |
| UE Identity #1 | Member |
| UE Identity #2 | Non-Member |
| UE Identity #3 | Member |

Accordingly, membership status of each mobile communication device 3 is readily available for use by a home base station 11-1a, 11-1b in the decision as to whether handover to the coexisting home base station 11-1b, 11-1a is likely to be successful.

(Modifications and Alternatives)

A detailed embodiment has been described above. As those skilled in the art will appreciate, a number of modifications and alternatives can be made to the above embodiment whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, the FAPs each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the FAPs as a signal over a computer network, or on a recording medium. Further, the functionality performed by part or all of this software may be performed using one or more dedicated hardware circuits. However, the use of software modules is preferred as it facilitates the updating of the base station and other functions of the FAPs.

It will be appreciated whilst the dual mode FAP 11-1 is described as effectively providing a dual femtocell that supports LTE/E-UTRAN and UTRAN the dual mode FAP 11-1 may also be thought of as providing two distinct single femtocells one of which supports LTE/E-UTRAN and the other of which supports UTRAN.

Whilst the FAPs 11 in the example of FIG. 1 are coupled directly to the broadband access network 15, the FAPs 11 may be coupled to the access network 15 via a residential gateway. The residential gateway may connect to the broadband access network 15 via a suitable Internet connection such as the ADSL or cable connection 16 and the H(e)NBs of the FAPs 11 may be programmed with the IP address of a security gateway (not shown) within the core network 8 so that, when powered up, the H(e)NBs initially connect to the pre-programmed security gateway.

In the above description, the dual mode FAP is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

For example, the dual FAP may be implemented in an FAP architecture having a single integrated base band chipset for implementing the functions of both the HNB and the HeNB. The dual FAP may also be implemented in an FAP architecture having separate base band chipsets for respectively providing the HNB and the HeNB.

Although for efficiency of understanding for those of skilled in the art, the invention has been described in detail in the context of a dual FAP comprising the functionality of two home base stations (HNB and HeNB), the principles of the invention can be applied to a multimode FAP comprising the functionality of more than two home base stations with the corresponding elements of the system changed as required.

Furthermore, although a dual mode FAP having an LTE radio access technology based home base station (HeNB) and a UMTS radio access technology based home base station (HNB) the FAP may, alternatively or additionally, have home base station functions that operate using any suitable radio access technology and/or frequency band. For example, a multimode FAP (such as a dual mode FAP) may have a plurality of home base station functions that each operate using the same radio access technology but different frequency bands.

It will be appreciated that the term radio access technology (RAT) is a term of art that will be readily understood by those skilled in the art to refer collectively to the various communication methods, communication protocols, signal encoding/decoding, and/or the like techniques required to connect to a communication cell via a particular communication cell that operates using that radio access technology. As described above, cells operating using the same RAT may nevertheless operate using different frequency bands.

It will also be appreciated that whilst the benefits of the invention apply, in particular, to a dual mode (or multimode) FAP, aspects of the invention could also be applied in a single mode FAP, or a macro base station, where information relating to the congestion status and access control/CGI membership of a neighbouring cell is obtained by the source base station in advance of a mobility procedure being initiated and the decision on handover target may be based on the acquired information.

Whilst each home base station 11-1a, 11-1b has been described as being able to acquire access management parameters by sending an enquiry to the repository of the CSG subscriber/access control list, the each home base station 11-1a, 11-1b may be able to derive the access management parameters implicitly based on past historical data for the success or failure of handover of the mobile communication device to the coexisting home base station 11-1b, 11-1a.

Various other modifications will be apparent to those skilled in the art and will not be described in further detail here.

This application is based upon and claims the benefit of priority from United Kingdom patent application No. 1120956.6, filed on Dec. 6, 2011, the disclosure of which is incorporated herein in its entirety by reference.

The invention claimed is:

1. A communication system, comprising:
a communication network comprising a plurality of communication cells, a plurality of mobile communication devices each operable to connect into the communication network via at least one of said communication cells, and communication apparatus for providing at least one of said communication cells, wherein the communication apparatus comprises:
a first base station component configured to provide a first communication cell via which a mobile communication device is configured to connect to a communication network, wherein the first base station component comprises:
  a data acquisition module configured to obtain information, associated with a second base station component, for use in determining whether or not an attempt to transfer communication of a mobile communication device to a second communication cell provided by the second base station component is likely to be successful,
wherein said information comprises at least one of:
(a) load information for use in determining whether sufficient resources are available at the second base station component for supporting communication by said mobile communication device; and
(b) access control information for use in determining whether said mobile communication device will be allowed access to communicate using the second base station component;
a management module configured to determine whether or not an attempt to transfer communication of a mobile communication device to the second communication cell of said second base station component is likely to be successful based on said obtained information; and
an initiation module configured to initiate, when a transfer attempt is determined to be unlikely to be successful, a mobility procedure for transferring said communication of said mobile communication device connected via said first communication cell, to another communication cell based on a comparison of a frequency band used by said second communication with a frequency band used by at least one neighbor communication cell.

2. Communication apparatus for providing at least one communication cell, the communication apparatus comprising:
a first base station component for providing a first communication cell via which a mobile communication device can connect to a communication network, wherein the first base station component comprises:
a data acquisition module configured to obtain information, associated with a second base station component, for use in determining whether or not an attempt to transfer communication of a mobile communication device to a second communication cell provided by the second base station component is likely to be successful, wherein said information comprises at least one of:
(a) load information for use in determining whether sufficient resources are available at the second base station component for supporting communication by said mobile communication device; and
(b) access control information for use in determining whether said mobile communication device will be allowed access to communicate using the second base station component;
a management module configured to whether or not an attempt to transfer communication of a mobile communication device to the second communication cell of said second base station component is likely to be successful based on said obtained information; and
an initiation module configured to initiate, when a transfer attempt is determined to be unlikely to be successful, a mobility procedure for transferring said communication of said mobile communication device connected via said first communication cell, to another communication cell based on a comparison of a frequency band used by said second communication cell with a frequency band used by at least one neighbor communication cell.

3. The communication apparatus according to claim 2, wherein said management module is operable, when said transfer attempt is determined to be likely to be successful, to initiate a mobility procedure for transferring said communication of the mobile communication device connected via said first communication cell to the second communication cell.

4. The communication apparatus according to claim 2, wherein said management module is operable, when said transfer attempt is determined not to be likely to be successful, to initiate a mobility procedure for transferring said communication of the mobile communication device connected via said first communication cell to a communication cell other than said second communication cell.

5. The communication apparatus according to claim 2, wherein said management module is operable to initiate said mobility procedure by transmitting, to the mobile communication device that is to be transferred, a message specifying a frequency band of a target cell for said transfer.

6. The communication apparatus according to claim 5, wherein a frequency band used by said second cell is compared with each frequency band respectively used by at least one other communication cell neighboring the second communication cell.

7. The communication apparatus according to claim 6, wherein said management module is operable, when said transfer attempt is determined not to be likely to be successful and at least one frequency band used by said at least one other communication cell is found to be different to said frequency band used by said second cell, to initiate a mobility procedure using said message, and
wherein the message specifies the frequency band of the target cell to be at least one frequency band different to said frequency band used by said second cell.

8. The communication apparatus according to claim 6, wherein, when said management module is operable, when said transfer attempt is determined not to be likely to be successful and no frequency band used by said at least one other communication cell is found to be different to said frequency band used by said second cell, to initiate a mobility procedure to blindly transfer said mobile communication device to any other neighboring cell.

9. The communication apparatus according to claim 5, wherein when said management module is operable, when said transfer attempt is determined to be likely to be successful, to initiate a mobility procedure using said message, and
wherein the message specifies the frequency band of the target cell to be the frequency band used by said second cell.

10. The communication apparatus according to claim 5, wherein said message comprises a radio resource control (RRC) message such as a RRC connection release message.

11. The communication apparatus according to claim 2, wherein said information obtained by said data acquisition module comprises load information for use in determining whether sufficient resources are available at the second base station component for supporting communication by said mobile communication device.

12. The communication apparatus according to claim 11, wherein said load information comprises a congestion status for said second base station component.

13. The communication apparatus according to claim 2, wherein said information obtained by said data acquisition module comprises access control information for use in determining whether said mobile communication device will be allowed to access to communicate using the second base station component.

14. The communication apparatus according to claim 13, wherein said access control information comprises at least one of:
an access mode and a closed subscriber group identity.

15. The communication apparatus according to claim 13, wherein in said first base station component the management module further determines, for a mobile communication device connected via the first communication cell, a membership status of that mobile communication device in a closed subscriber group associated with the second base station component.

16. The communication apparatus according to claim 15, wherein said management module is operable to determine a membership status from historical data identifying if at least one previous attempt to transfer the mobile communication device connected via the first communication cell to the second communication cell has been successful or unsuccessful.

17. The communication apparatus according to claim 15, wherein said management module is operable to determine a membership status by transmitting a message to a further communication device requesting the information.

18. The communication apparatus according to claim 2, wherein said management module is operable to determine whether a transfer of communication comprising a circuit switched fallback (CSFB) procedure to said second cell is likely to be successful based on said obtained information.

19. The communication apparatus according to claim 18, further comprising:
a mobility management module configured to initiate a mobility procedure for allowing or prohibiting CSFB to said second cell based on said determination as to whether or not said CSFB to said second cell is likely to be successful.

20. The communication apparatus according to claim 18, further comprising a data collector configured to acquire system information for use in said CSFB procedure while the first base station component is in a network monitor mode (NMM).

21. The communication apparatus according to claim 18, further comprising a data collector configured to acquire system information for use in said CSFB procedure via an operation administration and maintenance (OAM) interface.

22. The communication apparatus according to claim 18, further comprising a data collector configured to acquire system information for use in said CSFB procedure using a Self Organizing Network (SON) Transfer mechanism.

23. The communication apparatus according to claim 18, further comprising an indicator configured to indicate a user or an operator preference for a mobile communication device to use the first communication cell of the first base station component or the second communication cell of the second base station component in preference to other cells.

24. The communication apparatus according to claim 18, further comprising a network monitor mode module configured to identify a target cell for said CSFB procedure based on measurements acquired while the first base station component is in a network monitor mode (NMM).

25. The communication apparatus according to claim 18, further comprising a network monitor mode module configured to identify a target cell for said CSFB procedure based on an operation administration and maintenance (OAM) configuration.

26. The communication apparatus according to claim 2, further comprising:
the second base station component for providing said second communication cell via which a mobile communication device can connect to a communication network.

27. The communication apparatus according to claim 26, wherein said second base station component comprises:
a data acquisition module configured to obtain information, associated with the first base station component, for use in determining whether or not an attempt to transfer communication of a mobile communication device to the first communication cell provided by the first base station component is likely to be successful, wherein said information comprises at least one of:
(a) load information for use in determining whether sufficient resources are available at the first base station component for supporting communication by said mobile communication device; and
(b) access control information for use in determining whether said mobile communication device will be allowed access to communicate using the first base station component; and
a management module configured to determine whether or not an attempt to transfer communication of a mobile communication device to the first communication cell of said first base station component is likely to be successful based on said obtained information.

28. The communication apparatus according to claim 2, wherein said first base station component comprises one of a Universal Mobile Telecommunications System (UMTS) based home base station (HNB) and a Long Term Evolution (LTE) based home base station (HeNB).

29. The communication apparatus according to claim 2, wherein said second base station component comprises one of a Universal Mobile Telecommunications System (UMTS) based home base station (HNB) and a Long Term Evolution (LTE) based home base station (HeNB).

30. The communication apparatus according to claim 2, wherein said first communication cell operates using at least one of a Long Term Evolution (LTE) based radio access technology and a Universal Mobile Telecommunications System (UMTS) based radio access technology.

31. The communication apparatus according to claim 2, wherein said second communication cell operates using at least one of a Long Term Evolution (LTE) based radio access technology and a Universal Mobile Telecommunications System (UMTS) based radio access technology.

32. The communication apparatus according to claim 2, wherein a radio access technology that the first communication cell operates using is different to a radio access technology that the second communication cell operates using.

33. The communication apparatus according to claim 2, wherein a radio access technology that the first communication cell operates using is the same as a radio access technology that the second communication cell operates using, and wherein the frequency band that the first communication cell operates using is different to the frequency band that the second communication cell operates using.

34. The communication apparatus according to claim 2, wherein the communication apparatus comprises a femto access point.

35. A method performed by communication apparatus comprising a first base station component for providing a first communication cell via which a mobile communication device can connect to a communication network, the method comprising said base station component:
obtaining information, associated with a second base station component, for use in determining whether or not an attempt to transfer communication of a mobile communication device to a second communication cell provided by the second base station component is likely to be successful, wherein said information comprises at least one of:
(a) load information for use in determining whether sufficient resources are available at the second base station component for supporting communication by said mobile communication device; and
(b) access control information for use in determining whether said mobile communication device will be allowed access to communicate using the second base station component;
determining whether or not an attempt to transfer communication of a mobile communication device to the second communication cell of said second base station component is likely to be successful based on said obtained information; and
initiating, when a transfer attempt is determined to be unlikely to be successful, a mobility procedure for transferring said communication of the mobile communication device connected via said first communication cell, to another communication cell based on a comparison of a frequency band used by said second communication cell with a frequency band used by at least one neighbor communication cell.

36. A mobile communication device operable to connect to a communication cell provided by communication apparatus comprising a first base station component for providing a first communication cell via which a mobile communication device can connect to a communication network, wherein the first base station component comprises:
a data acquisition module configured to obtain information, associated with a second base station component, for use in determining whether or not an attempt to handover a mobile communication device to a second communication cell provided by the second base station component is likely to be successful wherein said information comprises at least one of:
(a) load information for use in determining whether sufficient resources are available at the second base station component for supporting communication by said mobile communication device; and
(b) access control information for use in determining whether said mobile communication device will be allowed access to communicate using the second base station component;
a management module configured to determine whether or not an attempt to transfer communication of a mobile communication device to the second communication cell of said second base station component is likely to be successful based on said obtained information; and
an initiation module configured to initiate, when a transfer attempt is determined to be unlikely to be successful, a mobility procedure for transferring said communication of the mobile communication device connected via said first communication cell, to another communication cell based on a comparison of a frequency band used by said second communication cell with a frequency band used by at least one neighbor communication cell.

* * * * *